United States Patent [19]

Uriuhara et al.

[11] Patent Number: 4,590,906
[45] Date of Patent: May 27, 1986

[54] FUEL CONTROL MECHANISM IN INTERNAL COMBUSTION ENGINE

[75] Inventors: Makoto Uriuhara, Totsuka; Junzo Kuroyanagi, Kamakura, both of Japan

[73] Assignee: Isuzu Motors, Ltd., Tokyo, Japan

[21] Appl. No.: 685,762

[22] Filed: Dec. 24, 1984

[30] Foreign Application Priority Data

Dec. 29, 1983 [JP] Japan ................. 58-252083

[51] Int. Cl.⁴ .................................. F02M 3/00
[52] U.S. Cl. ..................... 123/339; 123/361; 123/399
[58] Field of Search ............ 123/339, 342, 361, 399; 74/857, 866, 872, 873, 875, 876

[56] References Cited

U.S. PATENT DOCUMENTS

| | | | |
|---|---|---|---|
| 4,354,466 | 10/1982 | Dudley et al. | 123/361 |
| 4,367,805 | 1/1983 | Totani et al. | 123/361 |
| 4,455,978 | 6/1984 | Atago et al. | 123/361 |
| 4,474,083 | 10/1984 | Braun | 123/342 |
| 4,531,430 | 7/1985 | Holmes | 74/858 |

Primary Examiner—William A. Cuchlinski, Jr.
Attorney, Agent, or Firm—John E. Toupal; Harold G. Jarcho

[57] ABSTRACT

The invention is an internal combustion engine fuel control apparatus including a movable member for controlling the supply of fuel to the engine, the member being movable in one sense to increase fuel flow and movable in an opposite sense to decrease fuel flow; a control mechanism producing a variable level output for controlling the engine; an operator controlling movement of the movable member in response to the level of the output; an initiator coupled to the movable member and the operator and operative to initiate control of the movable member by the operator at a given level of the output; an adjustment means for adjusting the given level of the output; a bias element biasing the movable member in the opposite sense; and an idle set means for establishing an adjustable mechanism degree of movement of the movable member in the opposite direction.

6 Claims, 6 Drawing Figures

FUEL CONTROL MECHANISM IN INTERNAL COMBUSTION ENGINE

BACKGROUND OF THE INVENTION

This invention relates to a control mechanism for a fuel supply member of an internal combustion engine.

Automatic speed change gears have been proposed in which a fuel supply device and conventional, manually operated, synchronously meshed transmission gears are automatically controlled, together with a clutch mechanism. The automatic speed change gears are arranged such that the clutch mechanism is engaged or disengaged in response to a predetermined number of steps of a stepping motor. Controlled in a one-to-one relationship by the stepping motor is either a control rod of a fuel injection pump or a drive lever of a throttle valve of a carburetor. The stepping motor controls fuel supply during starting, changing of speed and stopping of the vehicle. In order to minimize shock when the clutch mechanism is disengaged during gear changes, the stepping motor is gradually stepped a predetermined number of steps "s" in a reverse direction to reduce torque of the driving system. The number "s" is based on the relationship between engine r.p.m. and the number of steps and is provided from the memory of a control computer. When "s" steps are completed, the clutch mechanism is disengaged. Conversely, when the clutch mechanism is being engaged, the stepping motor is stepped in the forward direction so as to provide sufficient driving torque which matches the engaging degree of the clutch mechanism and thereby minimizing the time for speed change. An example of automatic speed change gears of this type are described in U.S. Pat. No. 4,194,608.

A problem in the above described system is that the described driving torque is not always produced by a predetermined number of steps by the stepping motor. Because of play in the fuel injection pumps of present-day diesel engines, the relationship between the number of stepping motor steps and the driving torque are not always constant. Therefore, for example, when the clutch mechanism is engaged after gear changes, the force of the engine brake is exerted in some vehicles. Conversely, the engine is undesirably reved up in other vehicles. This lack of constancy is produced also in systems controlling the throttle valve of a carburetor, though to a lesser degree.

The above noted problem will be described further in connection with FIG. 1 which shows a conventional fuel control member in an internal combustion engine. A drive lever 5 for either a fuel control rod of a fuel injection pump or a throttle valve of a carburetor is supported from a base frame 6 by a shaft 9. Controlling movement of the lever 5 is a link 3 coupled to a stepping motor (not shown). An initial position of the drive lever 5 is adjusted by a set screw 8 supported by the base frame 6. The set screw 8 is set by a lock nut 7 at a position that provides a suitable idle r.p.m. of the engine. For example, with the position of drive lever 5 shown by dotted lines, an idle r.p.m. of 250 is produced.

Because of the above noted problems, the characteristic of engine r.p.m. (in this case the load is supposed to be constant) in relation to the operating angle "α" of the drive lever 5 will vary for different vehicles as shown by the curves 41 and 42 in FIG. 2. The solid curve 42 represents the desired characteristic while the dotted curve 41 represents an undesirable shifted characteristic. If, as shown by the curve 41, a desired shifting r.p.m. of, for example 1500 is reached prematurely, the engine r.p.m. becomes abnormally high when the clutch mechanism is engaged or disengaged while changing gears. Thus, speed change control is not smooth because a matching between the output and the load torques is not provided.

To provide the desired shifting r.p.m. of 1500, the characteristic represented by the dotted curve 41 in FIG. 1 can be shifted. This is done by adjusting the set screw 8 so that the drive lever 5 will produce the desired engine r.p.m. after movement over the operating angle "α" provided by the given number of steps "s" given to the stepping motor. However, in this case, as shown in FIG. 3, the idle r.p.m. is undesirably deviated or changed.

The object of the present invention, therefore, is to provide for an internal combustion engine a fuel control mechanism that establishes consistent engine r.p.m. for automatic gear shifting.

SUMMARY OF THE INVENTION

The invention is an internal combustion engine fuel control apparatus including a movable member for controlling the supply of fuel to the engine, the member being movable in one sense to increase fuel flow and movable in an opposite sense to decrease fuel flow; a control mechanism producing a variable level output for controlling the engine; an operator controlling movement of the movable member in response to the level of the output; an initiator coupled to the movable member and the operator and operative to initiate control of the movable member by the operator at a given level of the output; an adjustment means for adjusting the given level of the output; a bias element biasing the movable member in the opposite sense; and an idle set means for establishing an adjustable maximum degree of movement of the movable member in the opposite direction. Adjustment of the initiator provides a preselected optimum shifting r.p.m. while adjustment of the idle set means independently controls a desired idle r.p.m.

According to particular features of the invention, the movable member is mounted for pivotal movement in the one and opposite senses; the idle set means comprises a set screw engageable with the movable member; the operator comprises a pivot arm; the initiator comprises a portion of the pivot arm engageable with the movable member; and the adjustment means comprises a set screw engageable with the pivot arm. This efficient and compact structural arrangement provides the desired independently adjustable control of shifting and idle r.p.m.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 4:
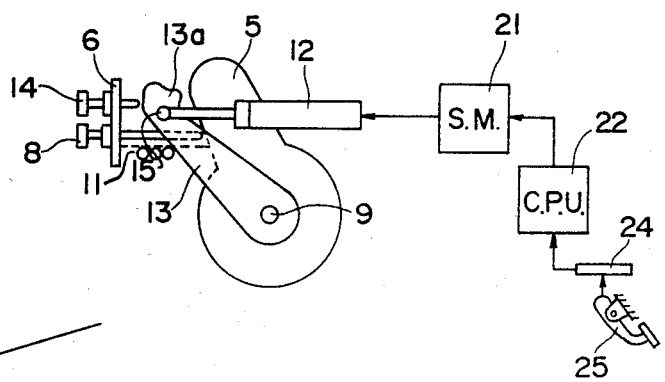
FIG. 4 is a side view showing a fuel control mechanism according to this invention.

A preferred embodiment of the invention is as shown in FIG. 4. Rotatably supporting a pivotable operator arm 13 is a shaft 9. Also supported by the shaft 9 is a lever member 5. A link 12 is connected to the pivot arm 13 by a pin 15 and is operatively coupled to a control stepping motor 21. Provided at one end of the control lever 13 and extending transversely therefrom is a tongue 13a. In response to clockwise rotation of the operator arm 13, the tongue 13a engages the edge of the drive lever 5 to produce movement thereof. The pivot member 5 is biased counterclockwise on the shaft 9 by a spring 11 and abutts against the idle set screw 8. Also, an adjustment set screw 14 that abutts against the pivot arm 13 is supported by the base frame 6. After the pivot arm 13 is moved a given number of steps by the stepping motor 21 from the position where it abutts against the screw 14, the ear 13a engages and moves the pivot member 5. In that way the position of the pivot member 5 at which the engine r.p.m. reaches a desired shift speed of 1500 r.p.m. is set. The stepping motor 21 is driven by an output signal from a micro-computer 22. Providing input signals for the computer 22 is an accelerator sensor 24 which detects movement of an accelerator pedal 25.

OPERATION

Figure 1:
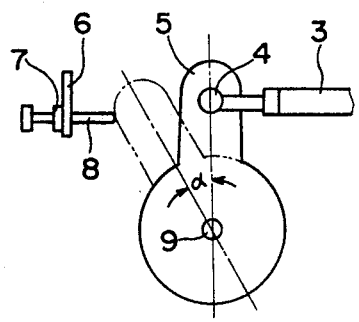
FIG. 1 is a side view showing a conventional fuel control mechanism for an internal combustion engine.
Figure 2:
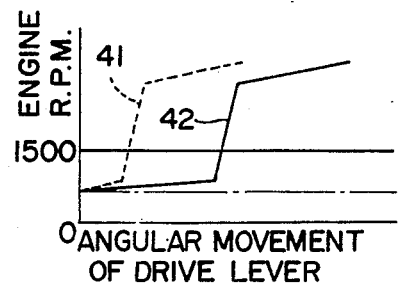
FIG. 2 is a diagram illustrating operating characteristics of the mechanism shown in FIG. 1.
Figure 3:
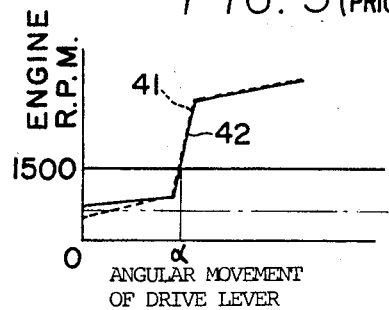
FIG. 3 is a diagram illustrating adjusted operating characteristics of the driving mechanism shown in FIG. 1.
Figure 5:
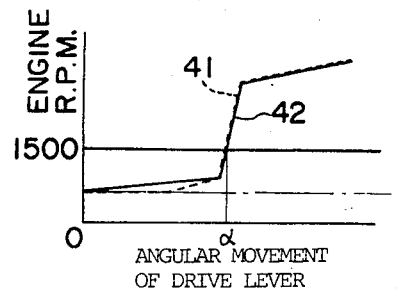
FIG. 5 is a diagram illustrating operating characteristics of the driving mechanism shown in FIG. 4.

The maximum counter-clockwise rotation of the pivot member 5, e.g. the idle r.p.m. of the engine, is controlled by the idle set screw 8. Therefore, as shown in FIG. 5, the desired idle r.p.m. of the engine is obtained by selecting a proper angle of engagement between the pivot member 6 and the idle set screw 8. On the other hand, when the pivot arm 13 is turned clockwise around the shaft 9, the pivot member 5 is engaged and driven by the tongue 13a in a fuel-increasing clockwise direction. The adjustment screw 14 is set so as to provide a predetermined angular position of the pivot arm 13 with respect to the pivot member 5. That predetermined angular position is selected to provide a desired shifting r.p.m. of 1500 in response to the predetermined number of stepping motor steps "s" stored in the memory of the computer 22. Thus, as shown in FIG. 5, the deviated characteristic represented by the dotted curve 41 is shifted to coincide with the desired characteristic represented by the solid curve 42. By using the set screw 8 and the adjustment screw 14, respectively, to independently control engine idle and shift r.p.m., both speeds can be optimized. Therefore, in addition to providing an optimum idle speed, the invention can smoothly control the output torque of the engine which affects the operation of the clutch mechanism in an automatic speed change apparatus.

Figure 6:
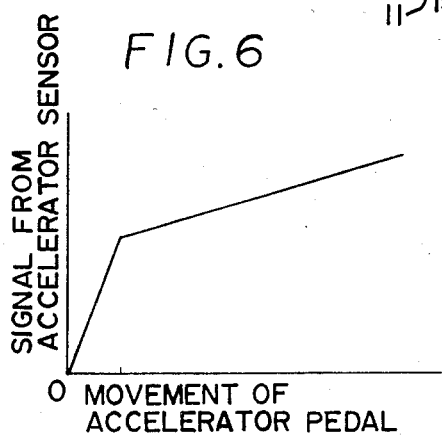
FIG. 6 is a diagram illustrating improved characteristics between the displacement of an accelerator pedal and a stepping motor.

The present invention can be applied not only to the internal combustion engine with an automatic speed change mechanism, but also to a remote driving control mechanism in which a fuel control member and an accelerator pedal are coupled by an electronic device rather than by a mechanical device. In that case, the displacement (play) in the operation of the accelerator pedal 25 between the idle r.p.m. and the shifting r.p.m. can be so great as to present a problem. Solution of that problem is obtained by establishing for the pivot member 5 operating angles which are substantially proportional to the operation of the accelerator pedal 25. That result can be obtained by providing a linkage mechanism including a modulator which supplies electrical signals of a characteristic shown in FIG. 6 to the micro-computer 22. Alternatively, the micro-computer 22 can be provided with a program such that the characteristics of the number of steps produced by the stepping motor 21 in accordance with the operation of the accelerator pedal 25 has a sharply increased variation between the idle and shifting r.p.m. ranges.

What is claimed:

1. An internal combustion engine fuel control apparatus comprising:
    a movable member for controlling the supply of fuel to the engine, said movable member being movable in one sense to increase fuel flow and movable in an opposite sense to decrease fuel flow;
    control means producing a variable level output for controlling the engine;
    operating means controlling movement of said movable member in response to the level of said output;
    initiation means coupled to said movable member and said operating means and operative to initiate said control of said movable member by said operating means at a given level of said output; and said operating means is movable, said initiation means is movable with said operating means and engageable with said movable member to produce movement thereof, and said operating and initiation means are shaped and arranged such that said initiation means undergoes lost motion in response to said output and fails to engage said movable member during initial movement in a first direction and during further movement in said first direction engages said movable member to produce movement thereof in said one sense; and
    adjustment means for adjusting said given level of said output from said control means so as to provide thereby a predetermined engine speed for gear shifting operations.

2. An apparatus according to claim 1 including bias means for biasing said movable member in said opposite sense, and idle set means for establishing an adjustable maximum degree of movement of said movable member in said opposite direction.

3. An apparatus according to claim 2 wherein said movable member is mounted for pivotal movement in said one and opposite senses, and said idle set means comprises a set screw engageable with said movable member.

4. An apparatus according to claim 3 wherein said operating means comprises a pivot arm, said initiation means comprises a portion of said pivot arm engageable with said movable member, and said adustment means comprises a set screw engageable with said pivot arm so as to limit rotation thereof in a direction opposite to said first direction.

5. An apparatus according to claim 4 wherein said control means comprises a stepping motor coupled to said pivot arm so as to produce pivotal movement thereof.

6. An apparatus according to claim 1 wherein said movable member is a pivotable member, said operating means comprises a pivotable arm engageable with said pivotable member, and said adjustment means produces pivotal movement of said arm so as to adjust the angular position thereof relative to said pivotable member.

* * * * *